US006810721B2

(12) United States Patent
Nakamura

(10) Patent No.: US 6,810,721 B2
(45) Date of Patent: Nov. 2, 2004

(54) SUBMERGED SAMPLE OBSERVATION APPARATUS AND METHOD

(75) Inventor: Naoki Nakamura, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/636,565

(22) Filed: Aug. 8, 2003

(65) Prior Publication Data
US 2004/0025579 A1 Feb. 12, 2004

Related U.S. Application Data

(62) Division of application No. 10/099,986, filed on Mar. 19, 2002.

(30) Foreign Application Priority Data

Mar. 28, 2001 (JP) ....................................... 2001-093533

(51) Int. Cl.[7] ................................................ G01B 5/28
(52) U.S. Cl. ........................................................ 73/105
(58) Field of Search ........................... 73/105; 250/306, 250/307

(56) References Cited

U.S. PATENT DOCUMENTS 5,319,960 A * 6/1994 Gamble et al. ............... 73/105
5,821,409 A * 10/1998 Honma et al. ................ 73/105

FOREIGN PATENT DOCUMENTS

| JP | 8-21845 | 1/1996 |
| JP | 9-119939 | 5/1997 |

* cited by examiner

Primary Examiner—Robert Raevis
(74) Attorney, Agent, or Firm—Oliff & Berridge, PLC

(57) ABSTRACT

An apparatus and a method for observing a submerged sample are disclosed, in which a scanning probe microscope comprises a cantilever with a probe arranged at the forward end thereof, a light source for applying light to the cantilever and a detector for detecting the light reflected from the cantilever, the apparatus further comprising a sample container having a side wall for holding a liquid therein. The probe is placed in closely opposed relation to the sample in the liquid in the sample container, and the relative positions of the probe and the sample are changed, so that based on the interaction between the probe and the sample, a surface image of the sample is produced to observe the sample. A device for preventing volatilization of the liquid having the sample submerged therein is formed on the surface of the liquid. An insulative liquid layer not mixed with the surface of the liquid having the sample submerged therein is formed on the surface of the liquid. Only the forward end of the probe is introduced into the liquid having the sample submerged therein, while the other portion of the probe is covered with the insulative liquid. The light from the light source is applied to the cantilever in the liquid without passing through the interface between the liquid and the atmosphere, and the reflected light is picked up in the liquid.

6 Claims, 3 Drawing Sheets

RELATED ART

SUBMERGED SAMPLE OBSERVATION APPARATUS AND METHOD

This is a Division of application Ser. No. 10/099,986 filed Mar. 19, 2002. The entire disclosure of the prior application is hereby incorporated by reference herein in its entirety.

BACKGROUND OF THE INVENTION

1. Field of the Invention

The present invention relates to an apparatus and a method for observing a sample submerged in a liquid by using a scanning probe microscope.

2. Description of the Related Art

The scanning probe microscope is a device whereby the surface of a sample can be observed with high resolution, and includes an interatomic force microscope (AFM) and a scanning tunneling microscope (STM).

In the interatomic force microscope, a cantilever having a probe arranged at the forward end thereof is brought in closely opposed relation to the surface of a sample and the sample surface is scanned by the probe thereby to measure the displacement of the cantilever caused by the interatomic force exerted between the probe and the sample. The amount of displacement is proportional to the interatomic force exerted between the probe and the sample surface. Therefore, the shape of the sample surface can be measured, by scanning the probe relatively on the sample surface while detecting and maintaining a constant amount of displacement by feedback.

With the scanning tunneling microscope, on the other hand, a bias voltage is applied between a probe and a sample, and a tunnel current flowing between the probe and the sample is measured. The probe is scanned on the sample surface while maintaining a constant tunnel current by feedback, for example. Since the probe moves along the shape of the sample surface, the surface shape of the sample can be measured.

A sample submerged in a liquid may be observed under the scanning probe microscope. FIG. 1 shows a type of interatomic force microscope for observing a sample submerged in a liquid.

In FIG. 1, reference numeral 1 designates a light source for emitting light such as a laser beam, numeral 2 a cantilever having a probe 3 at the forward end thereof for reflecting the light emitted from the light source 1 and refracted in a prism 4, and numeral 5 a light detector such as a photodiode for detecting the light reflected on the cantilever and further on a mirror 6. Numeral 8 designates a sample fully submerged in a liquid 9 contained in a cup-shaped container 10 having an open upper portion. The cantilever 2 is mounted with the probe 3 directed down on a support member 7 fixed on a fixing portion, not shown, in such a manner as to be submerged in the liquid 9 filling the container 10. A piezoelectric actuator 11 is mounted on the lower surface of the bottom of the container 10. As a result, the sample 8 can be moved together with the container 10 in any of x, y and z directions.

In the interatomic force microscope, the z-axis piezoelectric device of the piezoelectric actuator 11 is driven by a z-axis (vertical axis in FIG. 1) height adjust signal from a scan generator (not shown), so that the distance between the probe 3 and the sample 8 is set to an initial distance d (nm). The light emitted from the light source 1, on the other hand, is refracted in the prism 4 and reflected on the surface of the side of the cantilever 2 far from the sample. The reflected light is reflected on the mirror 6 and detected by the light detector 5. Under this condition, the x-axis and y-axis piezoelectric devices of the piezoelectric actuator 11 are driven by a control signal produced from the scan generator, so that the sample 8 is moved along the x-axis direction (lateral direction in FIG. 1) and the y-axis direction (longitudinal direction perpendicular to the x axis in FIG. 1), respectively. Due to unevenness on the surface of the sample 8 to be observed, the distance between the probe 3 and the surface to be observed deviates from the initial distance d, thereby changing the interatomic force between the probe 3 and the sample 8. In this case, the probe 3, trying to maintain the initial distance d, is moved vertically in accordance with the unevennesses of the surface to be observed. This vertical movement also changes the inclination of the cantilever 2, and hence the position of the reflected light entering the light detector 5. The detected position change of the reflected light is converted to the position change in z-axis direction, and based on the converted signal (image signal), an image of an uneven surface of the sample in the liquid is observed.

Also when observing a sample submerged in a liquid under the scanning tunneling microscope, as in the case of the interatomic force microscope described above, a sample is submerged in a liquid filling a cup-shaped container and brought close to the probe, so that a measurement is taken while applying a bias voltage between the probe and the sample.

The use of the scanning probe microscope makes it possible to observe the surface change of a sample in the electrochemical reaction process in an electrolytic solution and thus observe the chemical reaction visually. In such a case, the sample is submerged in the electrolytic solution and the probe is brought close to the sample to obtain a surface image of the sample. However, since the upper portion of the sample container is open, the electrolytic solution is volatilized and the composition of the electrolytic solution changes during the observation, thereby making a correct analysis of the chemical reaction impossible. On the other hand, in the case of the scanning tunneling microscope, the Faraday current flows from the probe in addition to the tunnel current. Therefore, the tunnel current cannot be accurately measured and an STM image cannot be obtained. Further, when the cantilever scans the surface of the sample, fluctuation of the liquid surface occurs and disturbs the optical axis of the laser beam, thereby making it impossible to produce a stable image.

The object of the present invention is to provide an apparatus and method for observing a submerged sample using the scanning probe microscope, wherein the adverse effects of a change in the concentration and composition of the liquid due to the volatilization of the liquid, generation of a leak current in the probe and fluctuation of the liquid surface are eliminated to produce a stable surface image.

SUMMARY OF THE INVENTION

In order to solve these problems, according to one aspect of the invention, there is provided a submerged sample observation apparatus comprising:

a scanning probe microscope including a cantilever having a probe arranged at the forward end thereof, a light source for applying light on the cantilever and a detector for detecting the light reflected from the cantilever;

a sample container having a side wall for holding a liquid therein; and means arranged on the surface of the liquid for preventing volatilization of the liquid;

wherein the probe is brought in closely opposed relation to a sample in the liquid in the sample container, the relative positions of a probe and a sample are changed and, based on the interaction between the probe and the sample, a surface image of the sample is produced thereby to observe the sample.

According to another aspect of the invention, there is provided a submerged sample observation apparatus comprising:

a scanning probe microscope including a cantilever having a probe arranged at the forward end thereof, a light source for applying light on the cantilever and a detector for detecting the light reflected from the cantilever; and a sample container having a side wall for holding a liquid therein;

wherein the probe is brought in closely opposed relation to a sample in the liquid in the sample container, the relative positions of a probe and a sample are changed and, based on the interaction between the probe and the sample, a surface image of the sample is produced thereby to observe the sample, and wherein an insulative liquid layer not mixed with the liquid having the sample submerged therein is formed on the surface of the liquid, and only the forward end portion of the probe is introduced into the liquid having the sample submerged therein, while the remaining portion of the probe is covered by the insulative liquid layer.

According to still another aspect of the invention, there is provided a submerged sample observation apparatus comprising:

a scanning probe microscope including a cantilever having a probe arranged at the forward end thereof, a light source for applying light on the cantilever and a detector for detecting the light reflected from the cantilever; and a sample container having a side wall for holding a liquid therein;

wherein the probe is brought in closely opposed relation to a sample in the liquid in the sample container, the relative positions of a probe and a sample are changed and, based on the interaction between the probe and the sample, a surface image of the sample is produced thereby to observe the sample, and wherein the light from the light source is applied to the cantilever in the liquid without passing through the interface between the atmosphere and the liquid having the sample submerged therein, and the reflected light is picked up in the liquid.

According to yet another aspect of the invention, there is provided a method of observing a sample submerged in a liquid using a scanning probe microscope comprising a cantilever having a probe arranged at the forward end thereof, a light source for applying light on the cantilever and a detector for detecting the light reflected from the cantilever;

wherein the probe is brought in closely opposed relation to a sample in the liquid in a sample container, the relative positions of the probe and the sample are changed and, based on the interaction between the probe and the sample, a surface image of the sample is produced thereby to observe the sample, and wherein means for preventing the volatilization of the liquid is arranged on the surface of the liquid.

According to a further aspect of the invention, there is provided a method of observing a sample submerged in a liquid using a scanning probe microscope comprising a cantilever having a probe arranged at the forward end thereof, a light source for applying light on the cantilever and a detector for detecting the light reflected from the cantilever;

wherein the probe is brought in closely opposed relation to the sample in the liquid in the sample container, the relative positions of the probe and the sample are changed and, based on the interaction between the probe and the sample, a surface image of the sample is produced thereby to observe the sample, and wherein an insulative liquid layer not mixed with the liquid having the sample submerged therein is formed on the liquid, and only the forward end portion of the probe is placed in the liquid while the remaining portion of the probe is covered by the insulative liquid layer.

According to a still further aspect of the invention, there is provided a method of observing a sample submerged in a liquid using a scanning probe microscope comprising a cantilever having a probe arranged at the forward end thereof, a light source for applying light on the cantilever and a detector for detecting the light reflected from the cantilever;

wherein the probe is brought into closely opposed relation to the sample in the liquid in a sample container, the relative positions of the probe and the sample are changed and, based on the interaction between the probe and the sample, a surface image of the sample is produced thereby to observe the sample, and wherein the light from the light source is applied to the cantilever in the liquid without passing through the interface between the atmosphere and the liquid having the sample submerged therein, and the reflected light is picked up in the liquid.

According to this invention, the means for preventing volatilization of the liquid having the sample submerged therein is provided on the surface of the surface of the particular liquid, and therefore volatilization of the liquid during the observation of the sample is prevented, and the chemical reaction can be observed in stable fashion. Also, in view of the fact that only the forward end of the probe is placed in the liquid having the sample submerged therein while the remaining portion of the probe is covered with the insulative liquid layer, therefore generation of Faraday current is suppressed in the probe, and the tunnel current can be accurately measured. Further, the light from the light source and the reflected light do not pass through the interface between the atmosphere and the liquid having the sample submerged therein, so that even when the surface of the liquid fluctuates, the effect of the fluctuation can be avoided.

DESCRIPTION OF THE PREFERRED EMBODIMENTS

Figure 1:
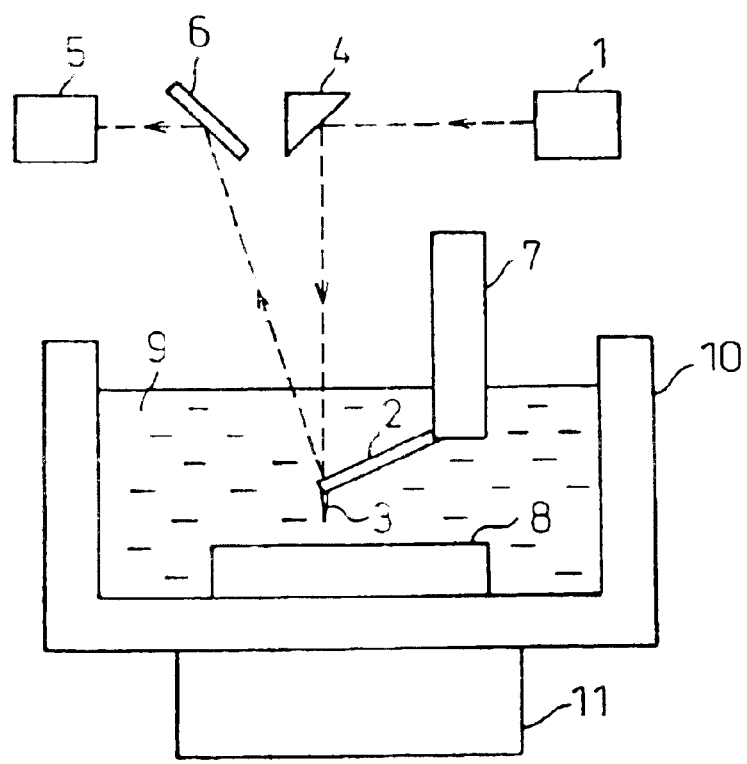
FIG. 1 is a schematic diagram showing a configuration of a conventional submerged sample observation apparatus using a scanning probe microscope.
Figure 2:
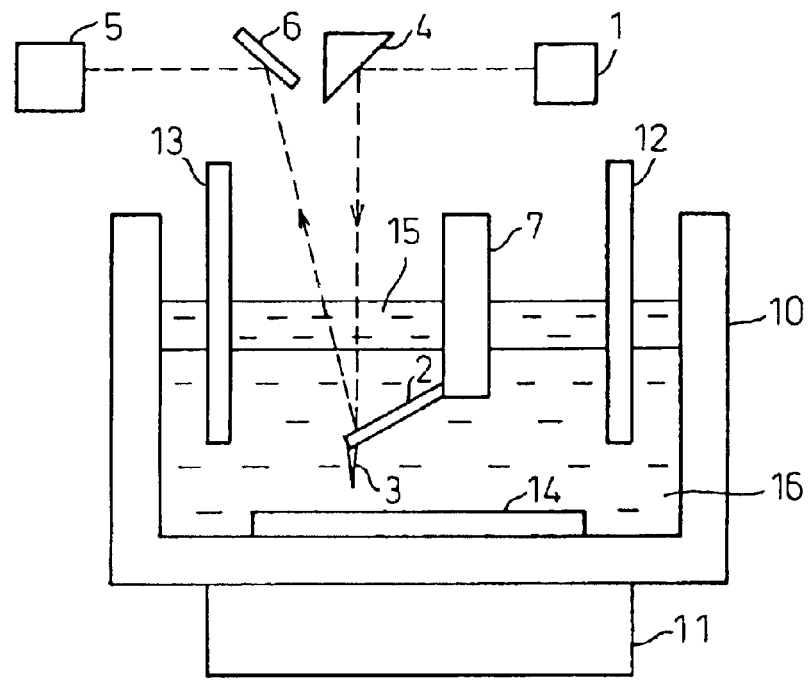
FIG. 2 is a schematic diagram showing a configuration of a submerged sample observation apparatus having a liquid volatilization prevention means according to the invention.

FIG. 2 shows a configuration of a submerged sample observation apparatus according to the invention for observing the electrochemical reaction in an electrolytic solution. In FIG. 2, as in FIG. 1, reference numeral 1 designates a light source, numeral 2 a cantilever, numeral 3 a probe, numeral 4 a prism, numeral 5 a light detector, numeral 6 a mirror, numeral 7 a support member, numeral 10 a container, and numeral 11 a piezoelectric actuator. Numeral 12 designates an opposed electrode, numeral 13 a reference electrode, numeral 14 a working electrode, and numeral 16 an electrolytic solution.

In the configuration of FIG. 2, a platinum electrode is used as the opposed electrode 12, a copper electrode is used as the reference electrode 13, and an electrode including a mica substrate with gold evaporated thereon is used as the working electrode 14. Upon application of an electric field to an electrolytic solution composed of 50 mM $CuSO_4$/100 mM $H_2SO_4$, a chemical reaction occurs in which the copper ions in the aqueous solution of copper sulfate are deposited on the evaporated gold film constituting the working electrode. In this reaction process, the probe 3 of silicon or silicon nitride is brought close onto the working electrode 14, and the laser beam (for example, an He—Ne laser beam having a wavelength of 632.8 nm) is applied from the light source 1 on the reflection surface of the cantilever 2. The probe 3 scans the surface of the working electrode 14, and the light reflected from the cantilever 2 is detected by the light detector 5. In this way, the chemical reaction, i.e. the deposition and separation of copper on the evaporated gold film making up the working electrode can be visually observed in time series.

In this observation process, the electrolytic solution 16 is an aqueous solution and is volatilized with the lapse of time. Thus, the composition of the electrolytic solution changes to such an extent that accurate analysis becomes impossible, especially in observing the secular chemical variation. In view of this, means 15 for preventing volatilization of the electrolytic solution 16 is formed in advance on the surface of the electrolytic solution 16. The volatilization prevention means 15 is formed of a layer of a sealing liquid having a low specific gravity and not mixed with the electrolytic solution. Such a sealing liquid can be an oil such as kerosene or paraffin. The ratio the sealing liquid represents of the electrolytic solution is not specifically limited, and can be selected appropriately in the range of 1 to 90 volume % of the electrolytic solution.

The volatilization prevention means 15 may be a Langmuir-Blodgett film (LB film) formed on the surface of the electrolytic solution 16. This LB film can be formed by developing and condensing film-forming molecules on the surface of the electrolytic solution so as to form a thin film having a thickness corresponding to the size of one molecule, i.e. a single molecular film. The film-forming molecules used for this purpose may be those of any of the amphipathic compounds such as stearic acid or lauryl alcohol having both hydrophobic and hydrophilic groups conventionally used for forming the LB film. The film-forming molecules are placed in a solvent such as chloroform and drop onto the surface of the electrolytic solution thereby to control the surface pressure of the developed film on a monitor. By employing this conventional method, a uniform single molecular film can be formed. In the case where the LB film is used as volatilization prevention means, volatilization of the electrolytic solution can be prevented on the one hand, and the fact that the thickness of the LB film is less than the wavelength of the laser beam advantageously reduces the effect of refraction of the laser beam passing through the LB film at the same time.

As another example of the volatilization prevention means 15, a resin film is used to cover the surface of the electrolytic solution 16. The surface of the electrolytic solution is sealed by the resin film with the probe 3 kept in the electrolytic solution. This resin film can be made of polyethylene, polypropylene, polystyrene, etc., which does not react with or is not affected by the electrolytic solution.

Figure 3:
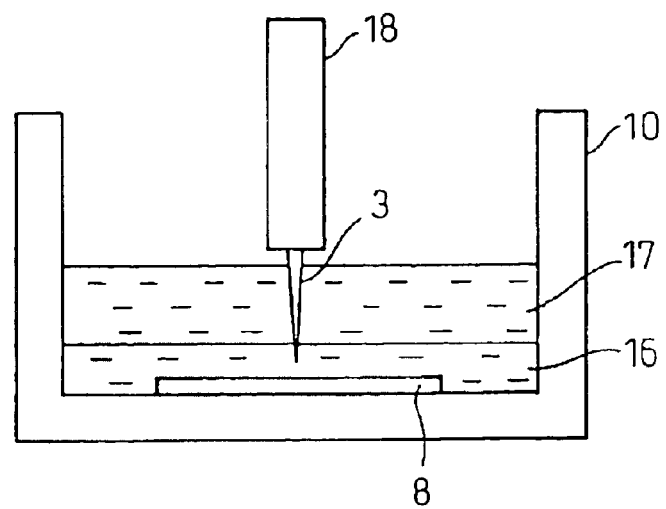
FIG. 3 is a schematic diagram showing a configuration of a submerged sample observation apparatus according to this invention, in which generation of a leak current is prevented.

In the case where the electrochemical reaction in the electrolytic solution described above is observed using the scanning tunnel microscope, a problem arises in that the probe works as an electrode and a leak current flows, thereby making it impossible to monitor the tunnel current. The configuration shown in FIG. 3 is employed to cope with this problem. Specifically, in FIG. 3, numeral 3 designates a probe, numeral 8 a sample, numeral 10 a container, and numeral 10 an electrolytic solution. Numeral 17 designates an insulative liquid, and numeral 18 a STM scanner. The electrolytic solution 16 is poured to such a level as to cover the sample 8, and the insulative liquid is poured on the electrolytic solution 16. The probe is formed of Pt—Ir or W, as in the prior art. The insulative liquid may be an insulating oil such as kerosene not mixed with the electrolytic solution. In view of the fact that the electrolytic solution in the container is in a minimum amount so as not to cover the sample, only the forward end of the probe is inserted in the electrolytic solution, while the other portion of the probe is covered by the insulative liquid. As a result, no leak current flows and the tunnel current can be detected in stable fashion.

In the conventional configuration shown in FIG. 1, the surface of the sample 8 is scanned using the probe 3 by moving the cantilever 2 or the support member 7 in or on the surface of the liquid 9. As a result, the surface of the liquid 9 fluctuates. During the period when the light from the light source 1 and the reflected light pass through the interface between the liquid 9 and the atmosphere, the fluctuation of the liquid surface providing the interface disturbs the optical axes of the incident light and the reflected light, so that a stable image cannot be produced. Also, refraction which may occur when the incident light and the reflected light pass through the liquid surface is another stumbling block to producing a stable image.

Figure 4:
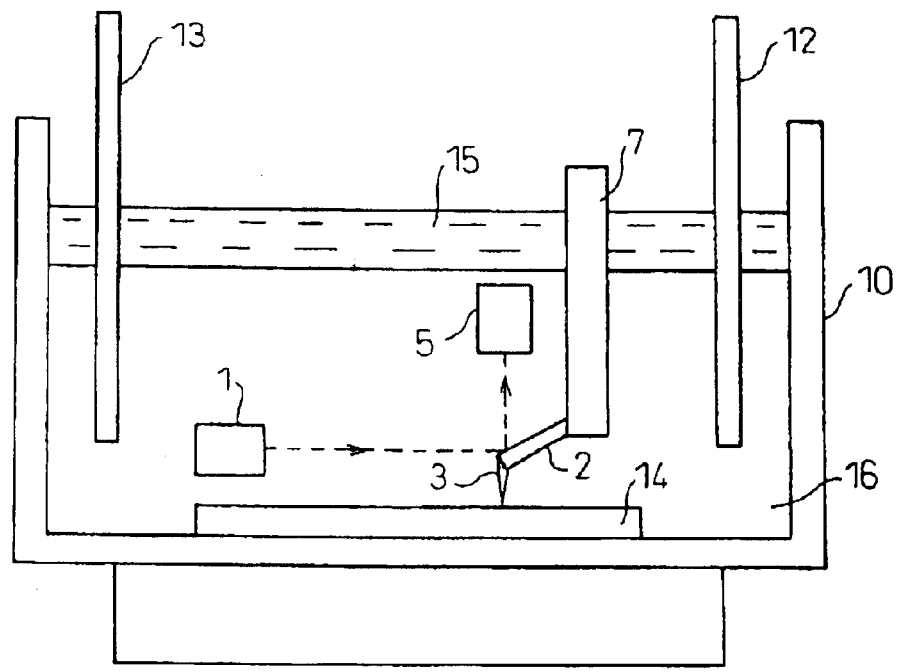
FIG. 4 is a schematic diagram showing a configuration of a submerged sample observation apparatus according to this invention, in which a light source and a light detector are arranged in an electrolytic solution.
Figure 5:
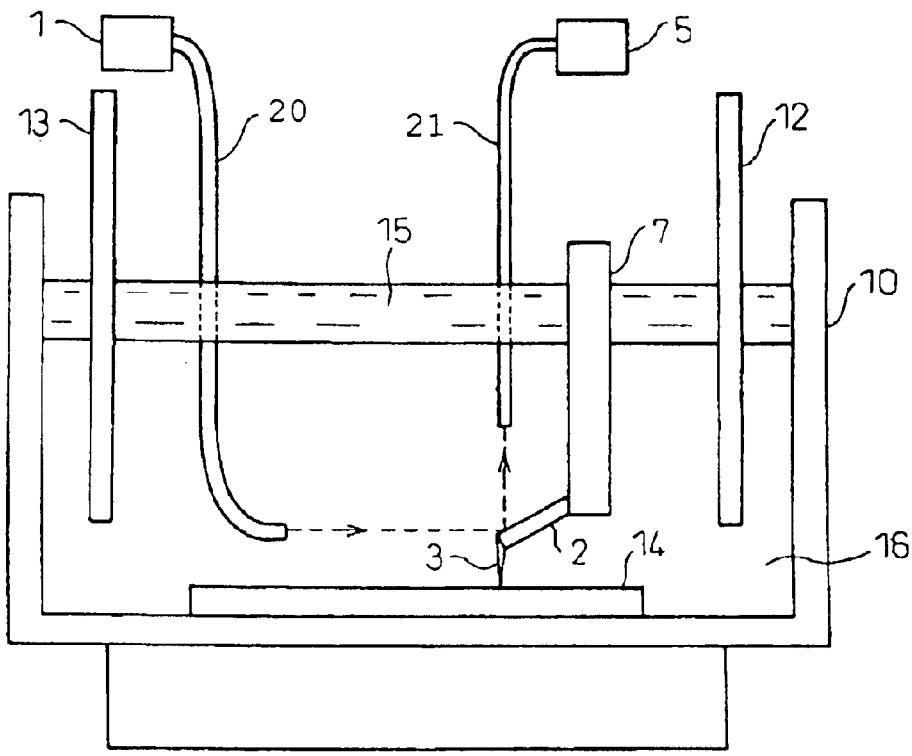
FIG. 5 is a schematic diagram showing a configuration of a submerged sample observation apparatus according to this invention, in which optic fibers are arranged in an electrolytic solution.

In view of this, as shown in FIG. 4, the incident light from the light source 1 and the light reflected from the cantilever 2 are prevented from passing through the liquid-atmosphere interface. To achieve this, the light source 1 and the light detector 5 are arranged in the electrolytic solution 16, for example. As another example, as shown in FIG. 5, the light from the light source 1 is introduced into the electrolytic solution 16 by an optic fiber 20 such as a glass fiber of $SiO_2$—$GeO_2$ or a plastic fiber of acryl, and further the light reflected from the cantilever 2 is picked up by a similar optic fiber 21, that is associated with the light detector 5, arranged in the electrolytic solution 16.

What is claimed is:

1. A submerged sample observation apparatus comprising:

a scanning probe microscope including a cantilever having a probe arranged at the forward end thereof, a light source for applying light on the cantilever and a detector for detecting the light reflected from the cantilever; and a sample container having a side wall for holding a liquid therein;

wherein the probe is brought in closely opposed relation to a sample in the liquid in the sample container, the relative positions of a probe and a sample are changed and, based on the interaction between the probe and the sample, a surface image of the sample is produced thereby to observe the sample, and wherein the light from the light source is applied to the cantilever in the liquid without passing through an interface between an atmosphere and the liquid having the sample submerged therein, and the reflected light is picked up by the detector in the liquid.

2. A submerged sample observation apparatus according to claim 1, wherein said light source and said detector are arranged in said liquid.

3. A submerged sample observation apparatus according to claim 1, wherein the light from said light source is applied from an optic fiber to said cantilever, and the light reflected from said cantilever is picked up by another optic fiber arranged in said liquid.

4. A method of observing a sample submerged in a liquid using a scanning probe microscope comprising a cantilever having a probe arranged at the forward end thereof, a light source for applying light on the cantilever and a detector for detecting the light reflected from the cantilever;

wherein the probe is brought into closely opposed relation to the sample in the liquid in a sample container, the relative positions of the probe and the sample are changed and, based on the interaction between the probe and the sample, a surface image of the sample is produced thereby to observe the sample, and wherein the light from the light source is applied to the cantilever in the liquid without passing through an interface between an atmosphere and the liquid having the sample submerged therein, and the reflected light is picked up by the detector in the liquid.

5. A method of observing a sample submerged in a liquid according to claim 4, wherein said light source and said detector are arranged in said liquid.

6. A method of observing a sample submerged in a liquid according to claim 4, wherein the light from said light source is applied from an optic fiber inserted in said liquid to said cantilever and the light reflected from said cantilever is picked up by another optic fiber.

* * * * *

UNITED STATES PATENT AND TRADEMARK OFFICE
CERTIFICATE OF CORRECTION

PATENT NO. : 6,810,721 B2
DATED : November 2, 2004
INVENTOR(S) : Naoki Nakamura

It is certified that error appears in the above-identified patent and that said Letters Patent is hereby corrected as shown below:

Title page,
Item [56], References Cited, U.S. PATENT DOCUMENTS, should read:
-- 5,319,960 A   *       6/1994         Gamble et al. .........73/105
   5,821,409 A   *       10/1998        Honma et al. ......... 73/105 --
FOREIGN PATENT DOCUMENTS, should read:
-- JP    8-21845      1/1996
   JP    9-54098      2/1997
   JP    9-119939     5/1997
   JP    10-132829    5/1998 --

Signed and Sealed this

Nineteenth Day of April, 2005

JON W. DUDAS
*Director of the United States Patent and Trademark Office*